United States Patent
Zeng et al.

(10) Patent No.: US 11,204,417 B2
(45) Date of Patent: Dec. 21, 2021

(54) SELECTIVE ATTENTION MECHANISM FOR IMPROVED PERCEPTION SENSOR PERFORMANCE IN VEHICULAR APPLICATIONS

(71) Applicant: GM GLOBAL TECHNOLOGY OPERATIONS LLC, Detroit, MI (US)

(72) Inventors: Shuqing Zeng, Sterling Heights, MI (US); Wei Tong, Troy, MI (US); Upali P. Mudalige, Oakland Township, MI (US); Lawrence A. Bush, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 363 days.

(21) Appl. No.: 16/406,164

(22) Filed: May 8, 2019

(65) Prior Publication Data
US 2020/0355820 A1    Nov. 12, 2020

(51) Int. Cl.
*G01S 13/86* (2006.01)
*G01S 13/931* (2020.01)
*G06K 9/00* (2006.01)
*G06K 9/62* (2006.01)

(52) U.S. Cl.
CPC .......... *G01S 13/867* (2013.01); *G01S 13/865* (2013.01); *G01S 13/931* (2013.01); *G06K 9/00791* (2013.01); *G06K 9/629* (2013.01); *G01S 2013/9322* (2020.01)

(58) Field of Classification Search
CPC .... G01S 13/865; G01S 13/867; G01S 13/931; G01S 2013/9322; G01S 7/417; G06K 9/00791; G06K 9/629
See application file for complete search history.

(56) References Cited

U.S. PATENT DOCUMENTS

| | | | |
|---|---|---|---|
| 7,460,951 B2 * | 12/2008 | Altan | G01S 13/726 701/536 |
| 8,704,653 B2 * | 4/2014 | Seder | G01S 13/723 340/461 |
| 9,274,525 B1 * | 3/2016 | Ferguson | B60W 10/06 |

(Continued)

OTHER PUBLICATIONS

J. Doty and B. LaCorte (2013) The Future of Autonomous Vehicles: Part I—Think Like a Robot, Perceive Like a Human. https://www.aeye.ai/news-and-views/the-future-of-autonomous-vehicles-part-1/.

*Primary Examiner* — Babar Sarwar
(74) *Attorney, Agent, or Firm* — Lorenz & Kopf LLP

(57) ABSTRACT

The vehicle mounted perception sensor gathers environment perception data from a scene using first and second heterogeneous (different modality) sensors, at least one of the heterogeneous sensors is directable to a predetermined region of interest. A perception processor receives the environment perception data and performs object recognition to identify objects each with a computed confidence score. The processor assesses the confidence score vis-à-vis a predetermined threshold, and based on that assessment, generates an attention signal to redirect the one of the heterogeneous sensors to a region of interest identified by the other heterogeneous sensor. In this way information from one sensor primes the other sensor to increase accuracy and provide deeper knowledge about the scene and thus do a better job of object tracking in vehicular applications.

20 Claims, 6 Drawing Sheets

(56) References Cited

U.S. PATENT DOCUMENTS

| | | | |
|---|---|---|---|
| 10,031,224 B2* | 7/2018 | Aoki | G01S 13/931 |
| 2005/0174222 A1* | 8/2005 | Kikuchi | G01S 17/931 |
| | | | 340/435 |
| 2007/0073473 A1* | 3/2007 | Altan | G01S 13/931 |
| | | | 701/518 |
| 2009/0010494 A1* | 1/2009 | Bechtel | B60R 1/00 |
| | | | 382/104 |
| 2009/0045999 A1* | 2/2009 | Samukawa | G01S 17/931 |
| | | | 342/70 |
| 2010/0191391 A1 | 7/2010 | Zeng | |
| 2012/0053755 A1* | 3/2012 | Takagi | B60W 40/04 |
| | | | 701/1 |
| 2014/0142800 A1* | 5/2014 | Zeng | G01S 7/4026 |
| | | | 701/30.6 |
| 2014/0355827 A1* | 12/2014 | Ogawa | B60Q 1/143 |
| | | | 382/103 |
| 2015/0331098 A1* | 11/2015 | Luebbert | G01S 13/34 |
| | | | 342/91 |
| 2017/0147888 A1 | 5/2017 | Zeng | |
| 2017/0307746 A1* | 10/2017 | Rohani | G01S 13/42 |
| 2018/0072320 A1* | 3/2018 | Fattal | B60R 1/00 |
| 2019/0311546 A1* | 10/2019 | Tay | G06T 19/006 |
| 2020/0098394 A1* | 3/2020 | Levinson | G06N 20/00 |
| 2020/0158864 A1* | 5/2020 | Achour | B60Q 9/00 |
| 2020/0255030 A1* | 8/2020 | Yamamoto | B60W 40/04 |
| 2020/0257306 A1* | 8/2020 | Nisenzon | G06K 9/00791 |

* cited by examiner

SELECTIVE ATTENTION MECHANISM FOR IMPROVED PERCEPTION SENSOR PERFORMANCE IN VEHICULAR APPLICATIONS

INTRODUCTION

The disclosure relates generally to perception sensors for use in vehicle guidance applications, including driver-assist, vehicle situational awareness and autonomous vehicles. More particularly the disclosure relates to a selective attention mechanism for integration of steerable sensors, to cost-effectively improve accuracy, precision and confidence in sensor readings.

Artificial perception systems are now being incorporated into vehicles, such as automotive vehicles, to provide improved performance ranging from driver assistance and situational awareness features to fully autonomous or self-driving capability. Currently such perception systems typically employ a combination of camera sensors and LiDAR (light imaging detection and ranging) sensors. In one popular form, the perception system comprises a package that marries a low-light, high definition optical camera with a solid-state nanometer laser LiDAR. The laser beam of the LiDAR is steerable across a software-defined scanning pattern, allowing the laser beam to track objects in the field of view as a human might—using radar-camera fusion process called biomimicry. Other less sophisticated systems rely on a more brute force raster scanning pattern, in which the laser beam sequentially illuminates all scene elements whether relevant or not.

While biomimicry has its appeal, it tends to be very computationally expensive. In a moving vehicle, under difficult real-world lighting and weather conditions, such radar-camera fusion systems may simply lack sufficient spatial resolution and accuracy to perform well. Raster-scan systems are likewise deficient in that they have difficulty determining a scene element's relevance to the current maneuver and end up wasting energy and bandwidth examining irrelevant regions.

SUMMARY

The systems and methods disclosed here provide a selective attention mechanism to steer the perception sensor (e.g., LiDAR laser beam, or in some instances the camera region of interest) to regions within the scene where deeper visual acuity is warranted. This selective attention mechanism is made possible, in part, by a sensor and processor-based system architecture that relies on bi-directional information flow between plural system component layers. In a computationally cost-effective way, the selective attention mechanism provides holistic scene comprehension, allowing sensor and computational resources to be focused where a more thorough inspection is warranted.

As more fully set forth herein, the disclosed selective attention apparatus improves perception sensor performance in object tracking in vehicular applications. A vehicle mounted perception sensor has a first sensor employing a first sensing modality and a second sensor employing a second sensing modality different from the first sensing modality. The first and second sensors each produce environment perception data gathered from a scene in which the vehicle is situated. At least one of the first and second sensors is steerable or directable by an attention signal to a predetermined region of interest.

A perception processor, receptive of the environment perception data produced by the first and second sensors, is programmed to:
(a) perform object recognition upon the environment perception data from at least one of the first and second sensors, which object recognition includes computing a confidence score associated with an object recognized,
(b) assess the relationship of the confidence score to a predetermined threshold,
(c) based on the assessed relationship, prime one of the first and second sensors with object identification information obtained from the other of said first and second sensors, to thereby direct attention of the one of the first and second sensors to a region of interest identified by the other of said first and second sensors by issuing an attention signal to the perception sensor; and
(d) again perform recognition of the object recognized within the environment perception data produced by the one of the first and second sensors after priming to identify an enhanced resolution object used to supply object tracking information.

Other desirable features and characteristics of the present disclosure will become apparent from the subsequent detailed description and the appended claims, taken in conjunction with the accompanying drawings.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
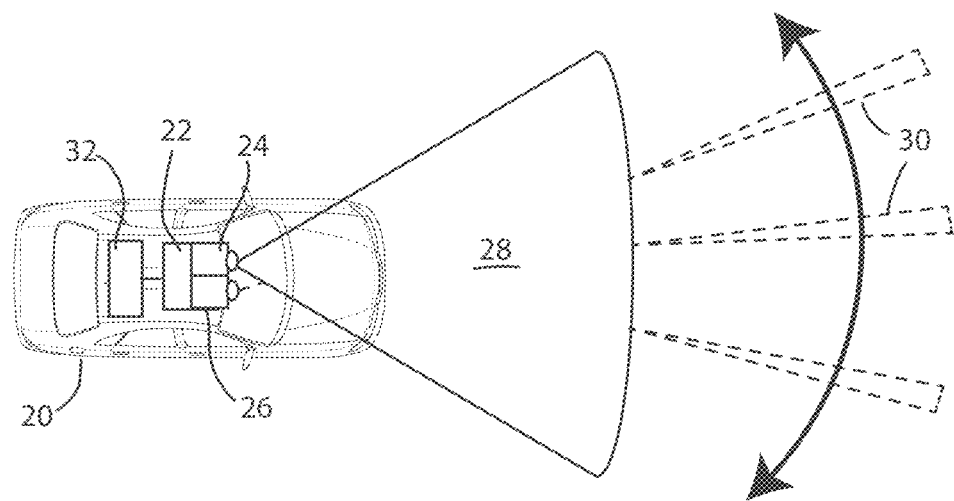
FIG. 1 is a plan view of an exemplary vehicle, illustrating the camera field of view and the steerable laser beam pattern.

To illustrate the principles of the disclosed technology, FIG. 1 shows an exemplary automotive vehicle 20. Vehicle 20 is equipped with an optical image detection and ranging perception sensor 22 that integrates a low light, high definition camera 24 with a steerable beam LiDAR 26. The camera's field of view 28 fans out from the front of the vehicle, as illustrated. The LiDAR 26 produces a narrow laser beam 30 that is steerable by electronics within the perception sensor package. For the illustrated embodiment a suitable perception sensor is available from AEye, Inc. (such as the model AE200). Coupled to the perception sensor 22 is an electronic control circuit 32 that implements the selective attention mechanism disclosed herein. Details of the electronic control circuit 32 are provided below.

Figure 2A:
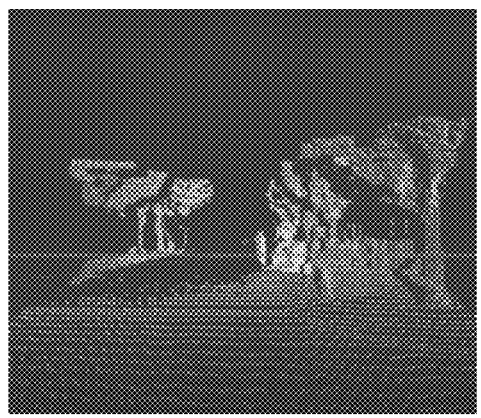
FIGS. 2A and 2B are exemplary images produced by the camera and LiDAR sensors.
Figure 2B:

Before presenting a detailed explanation of the disclosed selective attention mechanism, a basic understanding of the differences between camera 24 and LiDAR 26 will be helpful. In this regard, FIGS. 2A and 2B show sample images from each. FIG. 2A shows a scene as detected by the LiDAR 26; FIG. 2B shows the same scene as detected by the camera 24.

The camera 24 employs an image sensor, such as a CMOS device that converts light into electrical signals. The sensor device is manufactured to distribute across the rectangular surface of the sensor, separate red, green and blue sensor elements grouped into pixels that produce red, green and blue (RGB) signals when illuminated. The three RGB signals, when combined, allow a gamut of different colors to be detected. The pixel sensor elements are typically processed through an amplifier circuit. By adjusting the gain of the amplifier circuit the pixel sensors can be adjusted for greater or lesser sensitivity to light. This amplification allows the camera produce a properly exposed image of the scene within the field of view 28 over a wide range of different lighting conditions. The camera may include focusing optics, such as a lens system, that captures incoming light and focuses it on the sensor device. In most camera implementations, the individual pixel values are read-out in a raster pattern at a predetermined frame rate. Frame rate has an important bearing how information is captured.

Some sensor devices employ passive pixel technology where pixels of one row share one part of the read circuitry. Thus exposure and read-out are performed row by row. Frame rate in such passive technology devices is usually performed at a fixed rate determined by the physics of the pixel sensor elements and by the number of rows of the sensor.

In more sophisticated active technology sensor devices, the individual pixels of the sensor device are individually addressable, allowing a downstream image processor to read the RGB signal values of each pixel individually. Active pixel technology allows the downstream image processing to selectively process a user-defined or software-defined region of interest (ROI). Thus such active pixel technology devices can dynamically increase the frame rate, by selectively reading only the pixels in the user-defined or software-defined region of interest. This allows more information about a specific region to be captured over a given interval of time (producing higher information throughput and wider information bandwidth).

The LiDAR 26 captures information about the scene using a fundamentally different technique. The LiDAR laser fires rapid pulses of light at a surface in the laser's line-of-sight. An optical sensor within the LiDAR device detects when those pulses of light reflect back from and return to the sensor. By measuring the time for each pulse to bounce back, processing circuitry within the LiDAR calculates the distance or range between the sensor and the surface from which the pulse of light reflected. Because the LiDAR 26 has a steerable beam, a single laser source can be rapidly pointed in different directions, to bounce light off different surfaces within the scene and thus capture what is called a point cloud image of the scene. While it is possible to steer the laser beam in a raster pattern, resembling the pattern captured by camera 24, the LiDAR 26 is by no means restricted to such a predefined steering pattern. Rather, the beam steering processor within the LiDAR can steer the beam in virtually any user-defined or software-defined direction.

Heterogeneous Modalities

The camera 24 gathers environment perception data, typically across a predefined field of view, and produces an RGB image of a scene within its field of view 28. This RGB image captures well the horizontal (x-axis) and vertical (y-axis) positional information about objects within the scene. While depth or z-axis positional information can to some degree be inferred using perspective cues, capturing accurate depth (z-axis) information is not one of the camera's strengths.

On the other hand, capturing depth (z-axis) information is what the LiDAR was designed to do. The LiDAR gathers environment perception data, typically in a steerable direction, and produces a point cloud image of a scene. Thus by combining two disparate sensor technologies (camera and LiDAR) the perception sensor 22 allows the data captured from each to be intelligently combined in a process called sensor fusion. Combining data from multiple sources allows inherent deficiencies of one sensor type to be compensated for by inherent advantages of the other sensor type. In this case the two sources use heterogeneous modalities—they apply different physical principles and gather information differently. In this respect the camera and LiDAR can be described as providing orthogonal redundancy. Each gathers some common information about the scene (redundancy) but using entirely different techniques that are not dependent on one another (orthogonal). The camera gathers reflected light originating from external sources (the sky, street lamps, vehicle headlights), whereas the LiDAR gathers reflected light originating from its own laser beam. While LiDAR sensors been illustrated as the verifying sensor in the disclosed implementation, RADAR sensors can also be used. In this regard, RADAR typically uses a lower frequency of the electromagnetic spectrum (e.g., radio frequency) than LiDAR, which uses electromagnetic energy at a much higher frequency (e.g., in the optical spectrum).

Information Flow in the Attention Mechanism

In the disclosed system, sensor fusion of the camera and LiDAR is implemented using a sophisticated combination of components and information sources to dynamically inform the camera and LiDAR where to focus attention, while taking into account each of these sensors' strengths and weaknesses.

Figure 3:
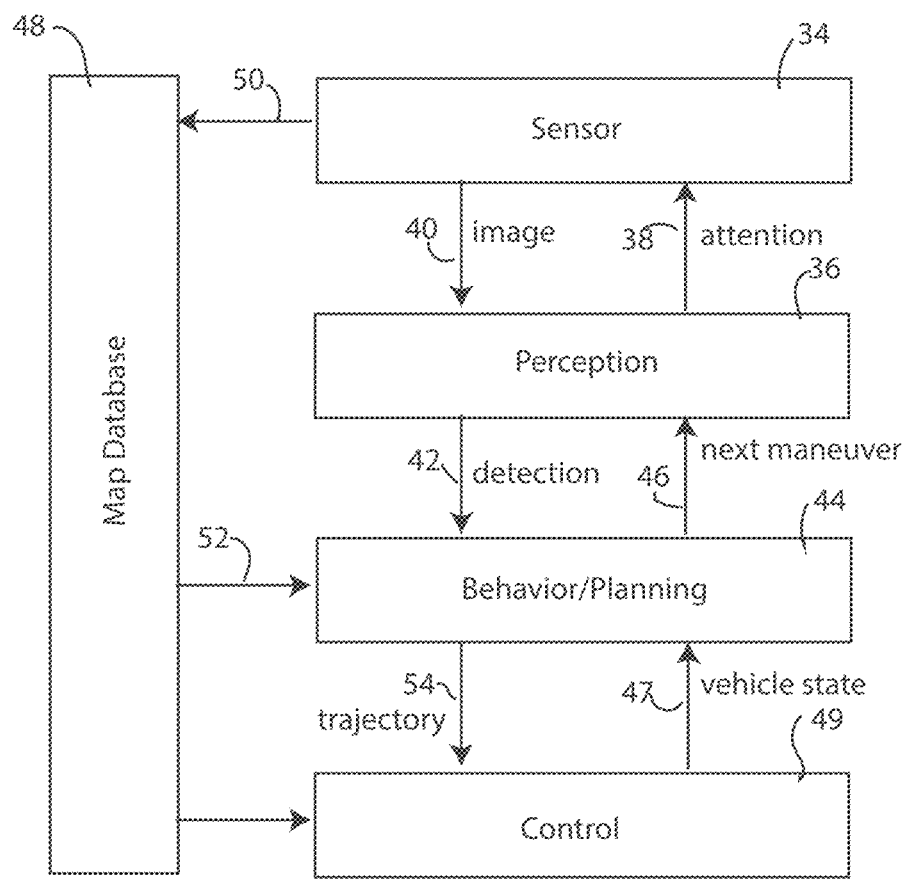
FIG. 3 illustrates a layered architecture useful in implementing a selective attention mechanism for an optical image and steerable beam sensor system.

FIG. 3 illustrates in block diagram form how the camera and LiDAR sensors can be dynamically informed where to focus attention. The diagram shows the system in terms of functional layers, where each layer is implemented by specific technology as will be described.

Referring to FIG. 3, the camera and LiDAR may be assigned to the Sensor layer 34. As previously explained, the LiDAR 26 produces a steerable beam that can be pointed in any user-defined or software defined direction. Additionally, depending on the implementation, the camera 24 may also have "steerable" or software-defined properties, in the sense that certain pixels within a region of interest can be singled out to produce higher information throughput and/or wider information bandwidth.

One objective of the disclosed attention mechanism is to inform the sensors within the Sensor layer 34 where attention should be focused, and conversely, where attention can be suppressed or withheld. As depicted in FIG. 3, the sensors within the Sensor layer are dynamically informed of where to focus attention by the Perception layer 36 (via the attention signal 38). This layer is implemented by microprocessor or logic gating circuitry (e.g., application specific integrated circuit (ASIC), field programmable gate array (FPGA) devices) that analyze sensor data 40 from the sensors within the Sensor layer (e.g., camera 24 and LiDAR 26).

If desired, this same microprocessor or logic gating circuitry can also be allocated to performing the functions of the other layers shown in FIG. 3 and described below.

To generate the attention signal 38, the microprocessor or logic gating circuitry of the Perception layer 36 can assess data from each of the sensor components (camera and LiDAR) to determine (a) how reliable the sensor measurement is (the degree of uncertainty) and (b) the degree to which the measurement from one sensor type is consistent with the measurement from another sensor type. Then based on this assessment, the microprocessor or logic gating circuitry of the Perception layer 36 will send attention signals to the Sensor layer, informing the appropriate sensor (or in some cases, each of the sensors) to focus attention in certain regions of interest.

For example, perhaps data from camera sensor results in a Perception layer computation that a possible oncoming vehicle in a certain region carries an 85% uncertainty factor (recognition was only 15% reliable). The LiDAR is then sent an attention signal informing it to train its attention specifically in that region where the possible vehicle was detected. If the LiDAR returns sensor data that confirms the presence of an object in that region of interest, then the Perception layer computes a new uncertainty factor, perhaps 5%, meaning that recognition of the oncoming vehicle is now 95% certain. In such case, the Behavior/Planning layer 44 is informed of the presence of the oncoming vehicle.

On the other hand, if the LiDAR does not detect an object in the region of interest, the Perception layer 36 computes an even higher uncertainty factor, perhaps 95%. In such case, poorly detected image from the camera is either not used by the Behavior/Planning layer 44, or is used with qualification that the perceived vehicle had a very high uncertainty factor.

In the foregoing example, the attention signal 38 redirected the pointing direction of the LiDAR laser beam. In an application where the camera has been implemented using active pixel technology, it is also possible to use the attention signal to inform the camera to selectively read only the pixels in the user-defined or software-defined region of interest to thereby gather a more accurate assessment of the current situation.

The microprocessor or logic gating circuitry of the Perception layer 36 can be implemented in a variety of ways, with the goal of analyzing attention signals from the sensors and other information, to identify specific objects within a scene and classify those objects with meaningful identifiers. For example, the microprocessor or logic gating circuitry of the Perception layer 36 might be tasked with identifying and classifying moving objects, such as cars, trucks, pedestrians, bicycles; and fixed objects, such as bridges, street lights, roadway edges and lane markers.

This may be accomplished by programming the microprocessor or configuring the logic gating circuitry to implement one or more neural networks, such as deep convolutional neural networks, that are trained to recognize a collection of objects that are likely to be encountered when the system is in use.

In addition to object identification and classification based on sensor data, the microprocessor or logic gating circuitry is also programmed or configured to take advantage of additional trajectory information about how detected objects appear to be moving in the scene, and how the vehicle itself is moving in the scene—or is planning to move within the scene.

To inform the Perception layer of this additional information, the Behavior/Planning layer supplies next maneuver information 46 to the Perception layer. The next maneuver information is calculated by microprocessor or logic gating circuitry assigned to the Behavior/Planning layer functions, taking into account data obtained from the vehicle, such as vehicle speed, steering wheel angle, turn signal indicator, vehicle navigation planned route, and the like. This vehicle state information 47 is supplied by various vehicle sensors and actuators that are represented here as part of the Control layer 49.

As illustrated in FIG. 3, the microprocessor or logic gating circuitry assigned to the Behavior/Planning layer 44 performs its functions using information obtained from several sources. As noted above, the Behavior/Planning layer 44 receives detection signals 42 from the Perception layer. These signals inform the microprocessor or logic gating circuitry assigned to the Behavior/Planning layer about the real time conditions within the scene itself. This is highly important information. However, in addition to this sensor-derived information, layer 44 also receives valuable information from the map database 48.

The map database 48 contains a previously stored record of the location of roadways, intersections and known landmarks. Vehicle navigation systems based on GPS and dead reckoning advantageously use such a map database to improve vehicle location calculations. The map database is largely responsible for why in a GPS navigation system one's vehicle is nearly always displayed on a roadway, even if the raw GPS data alone might place the vehicle several meters away, in an adjacent field for example.

In the disclosed embodiment, the map database 48 is enhanced to include landmark location data 50 obtained from the Sensor layer 34. These added landmark locations from the Sensor layer may be added as an overlay to the existing landmark data stored in the map database, and if desired, temporarily merged with the existing landmark data so that the pose information 52 supplied by the map database to the Behavior/Planning layer 44 can include landmarks observed by the Perception layer in providing a holistic assessment of where the vehicle is positioned within the space represented by the map data (the vehicle pose).

Whereas the Sensor layer provides information about real time conditions within the scene, the map database, to a large extent, contains information that has been collected and assembled a priori. Thus, depending on the age of the map data, some landmark data may be out of date. Overlaying or merging landmark data gathered from the Sensor layer effectively updates the map data on an ad hoc basis, which can help the Behavior/Planning layer perform its task of integrating a priori map data with the real time conditions being measured by the Sensor layer.

The Behavior/Planning layer 44 supplies trajectory information 54 to the Control layer 49. Microprocessor(s) or logic gating circuits of the Control layer uses this trajectory information (current trajectory) to compute the future trajectory of the vehicle in an autonomous or self-driving vehicle, or to compute driver assist guidance annunciations and tactile feedback in driver-controlled vehicles.

As FIG. 3 illustrates, the overall information flow within the sensor attention mechanism draws upon information from a variety of different sources (organized into the different layers in FIG. 3 to assist in the explanation). Importantly, there is bi-directional information flow (bi-directional data flow or signal flow) between and among these different layers. Thus, while the camera region of interest emphasis and LiDAR laser pointing direction are, in the first instance, controlled by the attention signal 38, the attention signal is, in part, derived from bi-directional information passed between and among all of the illustrated layers. The top two layers (Sensor layer and Perception layer) handle primarily scene-related situational information. The bottom two layers (Behavior/Planning layer and Control layer) handle primarily vehicle-related situational information pertaining to guidance, navigation and control (GNC) of the vehicle. In this context, guidance refers to determination of the desired path of travel or trajectory from the vehicle's current location to a designated target. Navigation refers to the determination, at a given time, of the vehicle's location and velocity (state vector). Control refers to the manipulation of the forces, such as steering controls, engine torque and thrust control needed to execute guidance commands while maintaining vehicle stability.

The cumulative effect of this bi-directional information flow is to empower a synergistic system where one sub-system or layer helps another sub-system or layer perform its respective task, with the cumulative result being a much more reliable assessment of the real time situation. The description that follows will focus on different aspects of how these synergies arise.

Object Fusion and Lane Fusion within the Perception Layer

As one of its primary functions, the Perception layer 36 mediates sensor fusion between the camera and LiDAR sensors of the Sensor layer. In a preferred embodiment, there is pixel-level alignment between the camera 24 and the LiDAR 26. This may be accomplished during manufacture of the perception sensor by training the camera on a test fixture while directing the LiDAR laser beam to different points on the text fixture. Calibration values for the x, y, z dimensions are then applied so that so that the resulting x, y, z readings of the respective camera and LiDAR devices are identical for those test points. The calibration values may be burned into ROM or stored in another form of nonvolatile memory that is then packaged with the perception sensor device.

Matrix of Sensor Fusion Use Cases

In the illustrated embodiments, the camera 24 functions as a full field of view sensor to capture a wide field of environment perception data. The field of view is typically defined by a lens system placed in front of the optical sensor. In the illustrated embodiments, the LiDAR 26 functions as a steerable verifying sensor that captures environment perception data in a steerable direction. In the more general case, any of these heterogenious modality sensor types can be used to inform a different one of the sensor types, where one sensor functions in the role of the field of view sensor and the other sensor functions in the role of the steerable verifying sensor. In other words, in designing a selective attention apparatus according to the disclosed techniques, the cueing direction between sensors is reversible. A first camera, LiDAR, RADAR or other generic field of view sensor can be cued by a second camera, LiDAR, RADAR or other generic steerable verifying sensor. Thus the following use cases are envisioned.

| Sensor Modality | Role |
| --- | --- |
| Camera | Field of view sensor |
| LiDAR | Field of view sensor |
| RADAR | Field of view sensor |
| Generic sensor that captures environment perception data from a predefined field of view | Field of view sensor |

-continued

| Sensor Modality | Role |
| --- | --- |
| Camera | Steerable verifying sensor |
| LiDAR | Steerable verifying sensor |
| RADAR | Steerable verifying sensor |
| Generic sensor that captures environment perception data in a steerable direction | Steerable verifying sensor |

In the context of the above use case matrix, the following sensor configurations are possible:
camera cues LiDAR
camera cues RADAR
camera cues camera
camera cues generic sensor
LiDAR cues LiDAR
LiDAR cues RADAR
LiDAR cues camera
LiDAR cues generic sensor
RADAR cues LiDAR
RADAR cues RADAR
RADAR cues camera
RADAR cues generic sensor
generic sensor cues LiDAR
generic sensor cues RADAR
generic sensor cues camera
generic sensor cues generic sensor.

Figure 4:
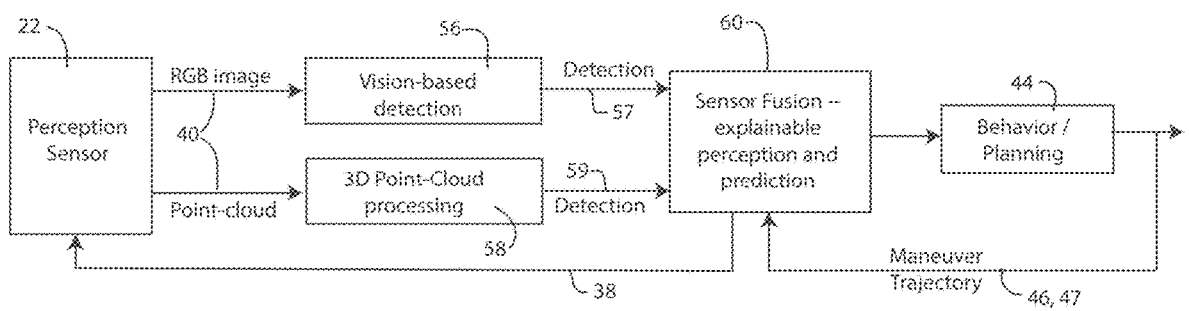
FIG. 4 is a block data flow diagram useful in understanding how sensor fusion may be implemented.

With reference to FIG. 4, the perception sensor 22 supplies an RGB image (from the camera) and a point-cloud image (from the LiDAR). These sensor data 40 are sent to Perception layer where different calculations are performed on the respective sensor data. As illustrated, the RGB image data (pixel data) are supplied to a vision-based detection algorithm 56 performed by the microprocessor or logic gating circuit of the Perception layer 36 (FIG. 3).

Vision-based detection 56 involves using the microprocessor or logic gating circuit to perform image recognition and classification. As discussed above, such image recognition and classification may be performed using a trained neural network, such as a deep convolutional neural network that has been trained a priori upon a collection of objects that are expected to occur in typical scenes during use.

Although in some instances depth (z-axis) information can be inferred from the otherwise two-dimensional camera data, the vision-based detection neural network is trained on two-dimensional data and thus the vision-based detection algorithm 56 performs recognition and classification of objects using two-dimensional data. The analysis could be performed by detecting edges within the RGB image, denoting the boundary of an object within the image, and then defining bounding boxes (rectangles) around a closed grouping of pixels defined by detected edges. The pixels within each bounding box are scaled up or down in size to match the dimensions of the data upon which the neural network was trained. Then image recognition is performed upon the scaled pixels.

The neural network will have been trained a priori to recognize a large collection of different objects (cars, trucks, bicycles, pedestrians, buildings, road signs, bridges, roadways, traffic lights, sky, and the like). The scaled pixels within a bounding box are essentially compared to each image pattern learned during training and the neural network will return a classification label of the learned object that the scaled bounding box pixels most closely represent. The neural network also provides a confidence score (e.g., a percentage score) indicating the degree of uncertainty (or conversely the degree of certainty) that the live data from the scene is a match to the previously learned image.

Similarly the point cloud data undergoes analysis through a 3D point-cloud processing algorithm 58 performed by the microprocessor or logic gating circuit. The point-cloud data are grouped into collections of points that likely correspond to a single object. In this case, depth (z-axis) information plays an important role in addition to the x-axis and y-axis information. Points that are clustered in three-dimensional space are treated by the point-cloud processing algorithm as belonging to the same object. Thus each such detected cluster is output by the point-cloud processing algorithm 58 as a detected object.

As with the camera image data, the point-cloud data can also be subjected to neural network analysis to classify detected point-cloud regions as belonging to a previously trained object. Such classification includes assigning a confidence score.

Note that the vision-based detection algorithm 56 and the point-cloud processing algorithm 58 each provide their own detection signals 57 and 59

It is worth noting at this point that the confidence score from a camera-based object recognition will likely be completely different from the score obtained from a LiDAR based object recognition. The reason for this is that camera-based recognition depends upon visually identifying object edges so that boundary boxes can be applied. LiDAR-based recognition depends upon identifying objects that are clustered together in 3-D space. Camera-based edge detection tends to fail in low contrast scenes where it becomes difficult to visually separate the object from the background. Point-cloud cluster detection tends to fail when two different nearby objects overlap along the laser beam line of sight. These differences illustrate why orthogonal redundancy of the present system is so powerful. When one sensor fails, the other may not.

The respective object detections made by the vision-based detection algorithm 56 and the point-cloud processing algorithm 56 are correlated with one another. This can readily be done because of the pixel-level alignment between camera and LiDAR. Sensor fusion of the camera and LiDAR detection signals is performed by the microprocessor or logic gating circuit of the Perception layer at 60. This involves populating a data structure that stores a record for each classified object within the scene, in association with the respective confidence scores produced by the respective algorithms 56 and 58. As explained above, the confidence scores obtained from the camera and LiDAR sources may well be different.

The sensor fusion algorithm 60 assesses the respective confidence scores and determines whether a low confidence detection by one sensor needs enhancement through directed attention. If detection of an oncoming vehicle was well predicted by the camera, but poorly detected by the LiDAR, and if an oncoming vehicle is relevant to the vehicle's current trajectory or planned maneuver, the fusion algorithm 60 will send an attention signal 38 to the perception sensor 22, informing it to train the LiDAR on the location of the oncoming vehicle in an effort to obtain a second higher confidence-level reading. As previously discussed, knowledge of the vehicle's current trajectory and knowledge of the planned maneuver is supplied to the sensor fusion algorithm 60 from the Behavior/Planning layer 44 as the next maneuver information 46 and vehicle state information 47.

In a preferred embodiment, the attention signal 38 can be delivered to the perception sensor in the form of an attention bitmap. The attention bitmap is implemented as a data structure specifying which pixels in the scene correspond to the region of interest where further attention is indicated. Use of a bitmap data structure is a highly efficient means of communicating sensor pointing control instructions to these heterogeneous sensors. A single bitmap can convey multiple different regions of interest in a single attention signal.

As applied to the camera sensor, the attention bitmap can be thought of as a bitmap mask, that causes the camera sensor to gather additional data over only the region of interest. By gathering additional data over just the region of interest, more incoming light information is collected, increasing information about that region, without taxing the image processing systems to revisit the entire scene again. While the bitmap can communicate binary (yes-no) instructions on whether to focus attention on a particular pixel or not, the bitmap can do more than that. It can be populated to communicate gradient information, based on confidence scores of particular pixels or regions of pixels. In this way, attention is focused on different regions to a greater or lesser degree, as required based on sensor confidence scores in the different regions.

As applied to the LiDAR sensor, the attention bitmap feeds the exact pointing coordinates to the LiDAR's laser directing system. Again, this is done without taxing the LiDAR to gather data from other unimportant regions that would then need to be processed.

It bears emphasizing that the sensor fusion algorithm 60 is actually mapping the RGB and depth raw image detection data onto a probabilistic representation of the environment. The confidence scores from the respective sensors allows the sensor fusion algorithm to assess how confident the system is about different regions within the scene. Meanwhile the inputs from the Behavior/Planning layer inform the sensor fusion algorithm which regions within the scene are actually important at the current time. In this way, the sensor fusion algorithm is able to supply an attention bitmap that is custom-designed in real time to redirect attention of the respective sensors to only those regions where such attention is needed. This saves computational resources and allows the process to be performed more quickly—highly important to many vehicle guidance applications.

Deep Integrated Fusion with Selective Attention

It can be important in some automation and vision applications to provide a perception that constitutes an explainable representation of what is being modeled. This can be challenging, particularly where neural networks with hidden layers are involved. The disclosed perception system achieves this through the use of a perception map. The perception map can be used, for example, to provide a real-time augmented reality view to a vehicle occupant or to support production validation during the vehicle manufacturing process.

Figure 5:
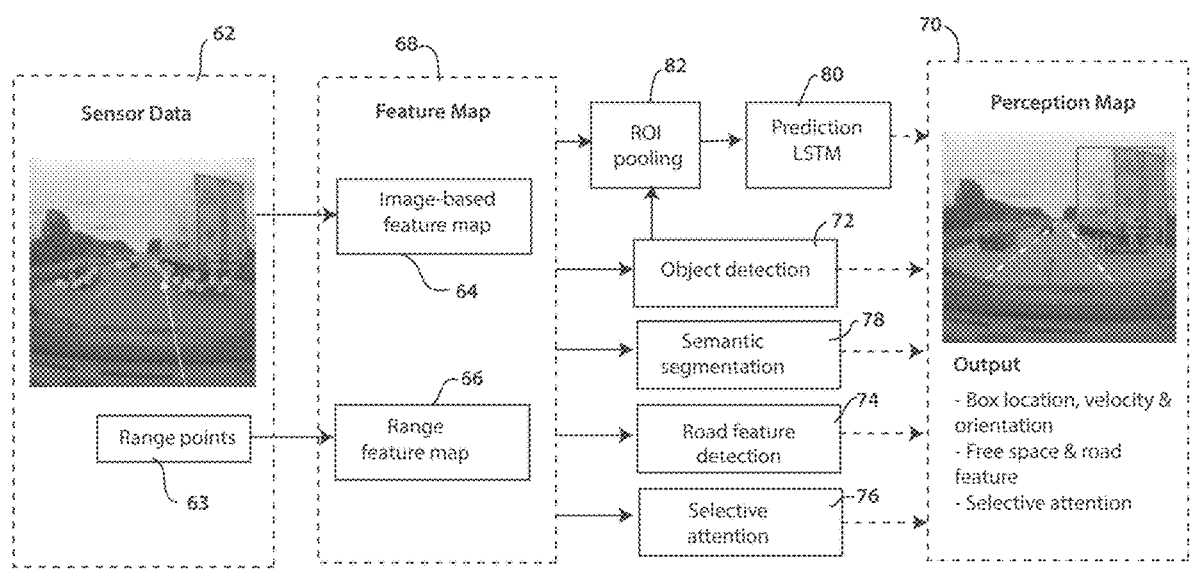
FIG. 5 is a block diagram illustrating how a neural network-based perception map may be generated to assist in providing selective attention signals to the sensors.

As seen in FIG. 5, the fused sensor data, shown at 62 comprises image sensor data (RGB) and point-cloud data representing range points 63 associated with (attached to) points on objects within the RGB image. Collectively the image-based feature map data 64 and the range feature map data 66 constitute an aggregate feature map 68 comprising four-dimensional information (x, y, z, t)—three spatial dimensions plus time. The feature map 68 constitutes the raw data that are then fed through a collection of image processing algorithms shown in FIG. 5 to generate the perception map 70. The feature map 68 serves as a machine-oriented representation of the real-world situation, whereas the perception map 70 serves as the human understandable, explainable representation.

The perception map 70 is derived from the feature map by the following image processing operations, which may be performed using the microprocessor or logic gating circuit(s) described above.

Object Detection:

The object detection algorithm 72 has been previously described, where bounding boxes are defined around RGB image components with detectible edges and around point-cloud clusters of LiDAR signals in close x, y, z proximity. These bounding box units are scaled and processed by the deep convolutional neural network that has been trained a priori on objects that are expected to be encountered in the real world.

Road Feature Detection:

The road feature detection algorithm 74 has also been previously described. Road features are detectable in much the same way as object detection is performed. Thus the object detection algorithm 72 may be used for this purpose. The road feature detection algorithm can be further augmented by using map database 48 data, as previously discussed. Known landmark features and roadway positions, found in the map data, can be used to increase confidence scores when road feature structures are detected by the perception sensor 22 where those features are expected to be based on the map data.

Selective Attention:

Generation of the attention signal 38 (FIGS. 3 and 4) has been previously described. The selective attention algorithm 76 determines which regions of interest are to receive selective attention fusing two sources of information: (a) the respective confidence scores resulting from image classification of the camera and LiDAR data; and (b) information from the Behavior/Planning layer as to which regions are expected to contain information that is relevant to the current vehicle trajectory and to the upcoming maneuver. The selective attention algorithm populates the attention bitmap data structure with regions of interest where obtaining a higher confidence score is warranted. Regions where the confidence score is already high, and regions that contain little or no information relevant to the current vehicle trajectory or upcoming maneuver are excluded from the attention bitmap. Conversely, regions that are relevant to the current vehicle trajectory or upcoming maneuver, and where image recognition confidence scores are low will be populated in the attention bitmap data structure.

Semantic Segmentation:

The semantic segmentation algorithm 78 has also been discussed above. Semantic segmentation involves the process of associating with each pixel in the image-based feature map, and optionally also in the range feature map, a classification label identifying what object the bounding box containing that pixel is associated with. This classification process is performed by the deep convolutional neural network described above.

Prediction LSTM and ROI Pooling:

The scene being analyzed by a moving vehicle is ever evolving. Retaining object recognition data from a scene that occurred a mile ago, or even thirty seconds ago, serves little purpose and can obscure important things that are happening now. Thus some mechanism needs to be employed to know when the image analysis of one scene needs to be retired, in favor of the current scene. In the disclosed system this is handled by an LSTM (long short term memory) neural network 80. The LSTM is preferably implemented separate from (in addition to) the deep convolutional neural network previously described.

The LSTM neural network includes a special feature called a forget gate layer that will selectively wash out information stored in the neural network layers as it ages.

To provide the LSTM neural network with input information upon which to operate, objects detected by the object detection algorithm 72, and the associated feature map data 68 are accumulated in a data store illustrated in FIG. 5 as the ROI pooling buffer 82. As noted earlier, the data constituting the feature map 68 comprise four-dimensional information (x, y, z, t)—three spatial dimensions plus time. The spatial information will typically be stored as a set of positional values associated with a given time frame. One can think about capturing positional data from a scene at a predetermined frame rate. In such case the time values associated with the x, y, z position values would increment in units of time measured by the frame rate.

The ROI pooling buffer 68 simply captures enough of a "backlog" of ROI data to allow the LSTM neural network to have a continuous supply of input data for processing. The increment of time units (frames) stored by the ROI pooling buffer is of course determined by the forget gate parameter of the LSTM.

Perception Map:

The perception map 70 is implemented as a data structure, which may be used to generate a visual situational display, such as illustrated in FIG. 5. The perception map data structure captures for moving objects the bounding box location, dimensions, and the velocity in which each bounding box is moving. In this regard, velocity is stored as a vector quantity representing both speed and direction or orientation of the movement vector. The perception map data structure captures for stationary regions, the geometric parameters needed to outline those regions. Such regions include the road surface, roadway (lane markers) and the free space (e.g. sky) where no objects of interest are seen. In the visual situational display these regions may be colored using colors to set them off from the detected moving objects.

The perception data structure stores a selective attention attribute in association with each detected object. The selective attention attribute thus indicates, on a relative scale, which objects were commanded to receive selective attention by the selective attention mechanism.

Although the prediction LSTM is designed to "forget" as the scene continues to change, it should be recognized that the perception data structure from which the perception map 70 is generated can be periodically captured to a data store (not shown). This would allow a replay of historic data if such feature were desired.

Process Flow

Figure 6:
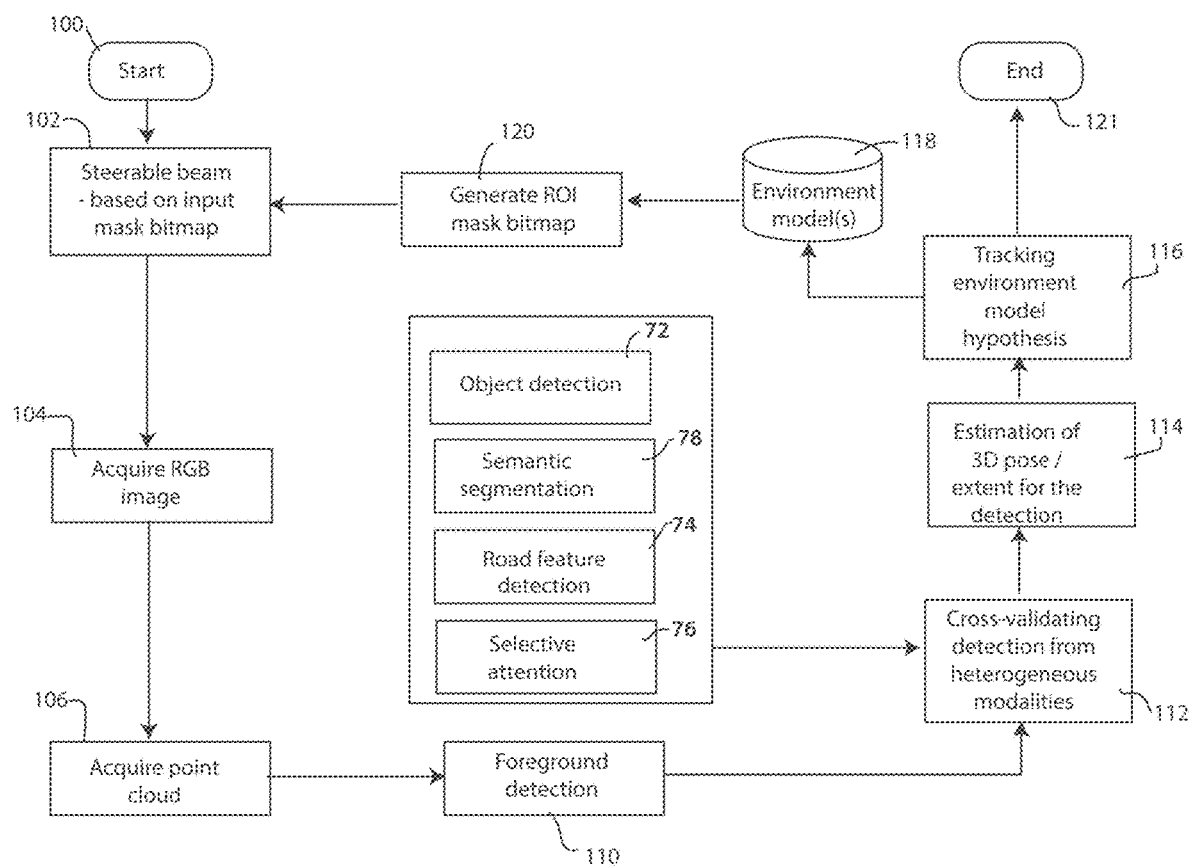
FIG. 6 is a process flow block diagram illustrating the selective attention process.

Refer now to FIG. 6, which shows the selective attention process. Unless otherwise indicated all of the illustrated process steps may be performed by the microprocessor or logic gating circuit described above. To simplify explanation the microprocessor or logic gating circuit will be referred to below simply as the "processor."

Begin at Start 100. The processor at 102 steers the steerable laser beam 30 (and/or the camera region of interest mask) based on the attention bitmap (attention signal 38). The processor then acquires the RGB image at 104 and the point-cloud data at 106.

Next at 108 the processor performs the algorithms 72, 74, 76, and 78 described in connection with FIG. 5. In parallel, the processor uses the point cloud data to perform foreground detection at 110. Foreground detection has not previously been discussed. This is accomplished by using the range data obtained by the LiDAR. The foreground is performed by scanning the LiDAR in a raster scan pattern to detect regions where no reflected signal was returned. That region represents the background (e.g., sky). This background region is then reversed using a Boolean NOT operator, so that all regions NOT background are treated as foreground.

Next the results of the algorithmic processes 108 and the foreground detection process 110 are operated on by the processor at 112 to perform a cross-validating detection process that leverages the heterogeneous modalities of the camera and LiDAR sensors. This operation is described in detail in FIG. 7 discussed below.

The processor at 114 then estimates the three-dimensional pose of the vehicle (i.e. the position and direction the vehicle is heading) and also the extent over which detection of other moving and stationary objects should be performed. The processor captures the three-dimensional pose of the vehicle based on information received from the vehicle, such as its GPS location, speed, compass heading, and steering angle. It calculates the range over which detection should be performed based in kinematic assessment of where the vehicle will travel within a predefined time window.

The processor uses this pose and extent-for-detection assessment to populate a tracking environment model hypothesis, at 116, of where the vehicle and all moving objects within the extent-for-detection range will be as time unfolds. The processor stores this information in an environment model data store 118, which the processor uses to generate the ROI bitmap mask (attention bitmap) at 120. This attention bitmap provides the seed used to inform the processor at step 102 where to command the sensors to turn their attention.

The process illustrated in FIG. 6 can operate through successive iterations by following the processing loop described above. The processor may exit the loop when required by exiting via the end point 121.

Cross-Validating of the Heterogeneous Sensors

Figure 7:
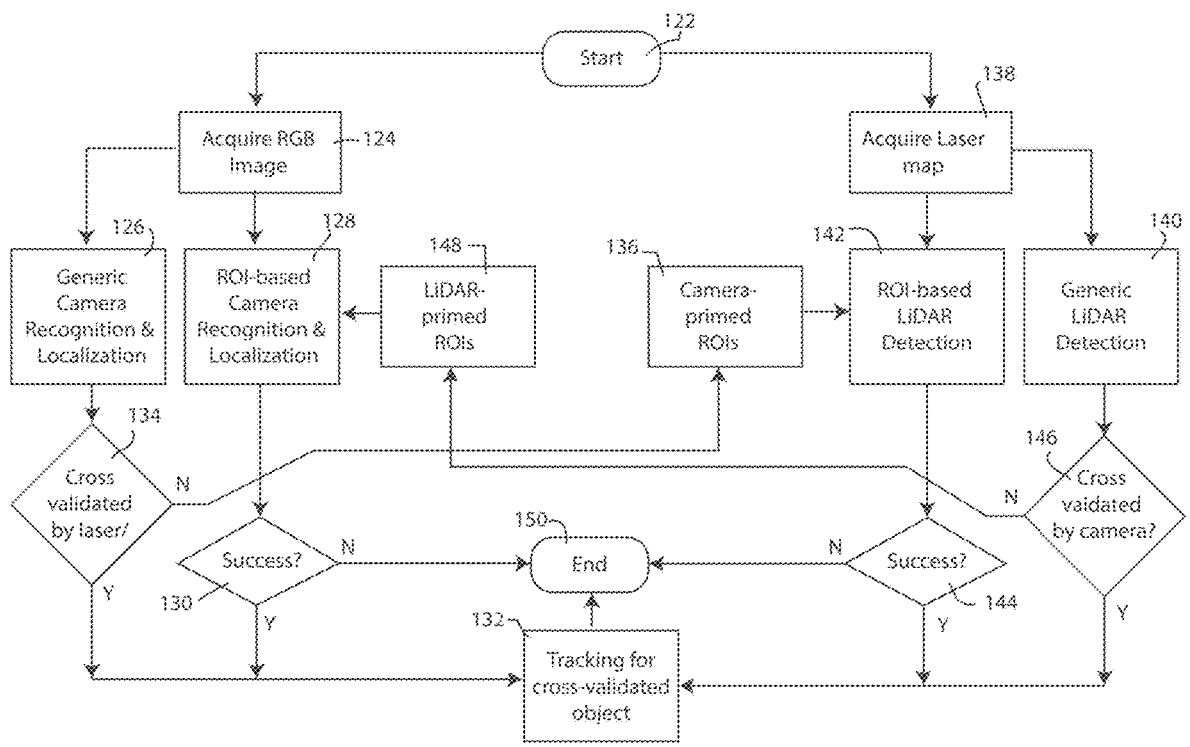
FIG. 7 is a signal flow diagram illustrating how cross-validation of the heterogeneous camera and LiDAR sensors may be used to improve the vision of each.

As mentioned several times above, the camera and LiDAR sensors are heterogeneous. They both provide information about the scene that is unfolding in real time, although they do so using entirely different physical principles. The selective attention mechanism leverages the nature of these sensors, to allow information from one sensor to help correct the vision of the other. How this is done is illustrated in FIG. 7.

As with FIG. 6, unless otherwise indicated all of the illustrated process steps may be performed by the microprocessor or logic gating circuit described above. To simplify explanation the microprocessor or logic gating circuit will be referred to below simply as the "processor."

Begin at step 122. The processor executes parallel branches, the left-most branch devoted to the camera sensor and the right-most branch devoted to the LiDAR sensor. For explanation purposes, we shall follow the left-most branch first, although both branches are actually operating in parallel.

The Left-Most Branch—Camera Sensor Processing

At 124 the processor acquires the RGB image from the camera sensor. The RGB image acquired from the camera sensor may represent: (a) generic camera data, captured without having been directed to a specific region of interest, or (b) region specific (ROI-specific) data, captured after having been directed to a particular region of interest by having been primed by information from the LiDAR (in step 148). One might wish to think of the generic camera data as low-resolution data across the entire field of view, and the region-specific data as high-resolution data directed to a particular region of interest. In this context high resolution simply means that more information (e.g., per pixel or per object) is captured than with low resolution.

In FIG. 7, if low resolution generic camera data is captured, the processor at 126 performs recognition (object detection and classification) and localization (correlating the detected object to the spatial coordinate system of the perception sensor). If high-resolution region-specific data has been captured, the processor at 128 performs recognition and localization. Note that these respective recognition and localization steps each follow different logical paths.

In the case where recognition and localization are based on region specific (ROI-specific) data (the high-resolution case), the processor assesses at 130 whether recognition of the identified object produced a confidence score above a predetermined threshold to warrant using the recognized object for tracking at 132. If recognition was not above the predefined threshold the object is not used for tracking and the process simply ends at 150.

In the case where recognition and localization are based on generic camera data (the low-resolution case), the processor tests at 134 whether the generic camera data have been cross-validated by the LiDAR data. In this context, cross-validation simply refers to whether the LiDAR also detected the object. If there has been cross-validation, then the processor allows the detected object to be used for tracking at 132.

If, however, the generic camera data have not been cross-validated by the LiDAR, the processor, at 136, causes the LiDAR to be primed with recognition results from the camera. Specifically, the processor causes an attention signal 38 (FIG. 3) to be sent to the LiDAR, informing the LiDAR to direct its laser beam to the region of interest where the camera system detected the object. Priming of the LiDAR in this fashion ensures that the LiDAR sensor will be able to perform ROI-based detection at step 142, as discussed next.

The Right-Most Branch—LiDAR Sensor Processing

At 138 the processor acquires the laser map data from the LiDAR. The acquired LiDAR data may represent: (a) generic LiDAR data, captured without having been directed to a specific region of interest, or (b) region specific (ROI-specific) data, captured after having been directed to a particular region of interest by having been primed by information from the camera (in step 136). As before, one might wish to think of the generic LiDAR data as low-resolution data across the entire field of view, and the region-specific data as high-resolution data directed to a particular region of interest. In this context high resolution simply means that more information (e.g., per pixel or per object) is captured than with low resolution.

If low resolution generic LiDAR data is captured, the processor at 140 performs recognition (object detection and classification) and localization (correlating the detected object to the spatial coordinate system of the perception sensor). If high-resolution region-specific data has been captured, the processor at 142 performs recognition and localization. Note that these respective recognition and localization steps each follow different logical paths.

In the case where recognition and localization are based on region specific (ROI-specific) data (the high-resolution case), the processor assesses at 144 whether recognition of the identified object produced a confidence score above a predetermined threshold to warrant using the recognized object for tracking at 132. If recognition was not above the predefined threshold the object is not used for tracking and the process simply ends at 150.

In the case where recognition and localization are based on generic LiDAR data (the low-resolution case), the processor tests at 146 whether the generic LiDAR data have been cross-validated by the camera data. In this context, cross-validation simply refers to whether the camera also detected the object. If there has been cross-validation, then the processor allows the detected object to be used for tracking at 132.

If, however, the generic LiDAR data have not been cross-validated by the camera, the processor, at 148, causes the camera to be primed with recognition results from the LiDAR. Specifically, the processor causes an attention signal 38 (FIG. 3) to be sent to the camera, informing the camera to employ a localized region of interest where the LiDAR system detected the object. Priming of the camera in this fashion ensures that the camera sensor will be able to perform ROI-based detection at step 128, as discussed above.

The net result of the foregoing logic is to allow tracking of an object to proceed at step 132 under any of the following scenarios:

1. Recognition was performed by both camera and LiDAR, the results of which have each been cross-validated against each other;
2. Recognition was performed by the camera after having been primed to process a region of interest identified by the LiDAR;
3. Recognition was performed by the LiDAR after having been primed to process a region of interest identified by the camera.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A selective attention apparatus for improved perception sensor performance in object tracking in vehicular applications, comprising:
   a vehicle mounted perception sensor having a plurality of sensors including a first sensor employing a first sensing modality and a second sensor employing a second sensing modality different from the first sensing modality, the first and second sensors each producing environment perception data gathered from a scene in which the vehicle is situated;
   at least one of the plurality of sensors being steerable by an attention signal to a predetermined region of interest;
   a perception processor receptive of the environment perception data produced by the plurality of sensors and programmed to:
   (a) perform object recognition upon the environment perception data from at least one of the plurality of sensors, which object recognition includes computing a confidence score associated with an object recognized,
   (b) assess a relationship of the confidence score to a predetermined threshold,
   (c) based on the assessed relationship, prime the first sensor with object identification information obtained from the second sensor, to thereby direct attention of the first sensor to a region of interest identified by the second sensor by issuing an attention signal to the perception sensor; and
   (d) again perform recognition of the object recognized within the environment perception data produced by the first one of the plurality of sensors after priming to identify an enhanced resolution object used to supply object tracking information.

2. The apparatus of claim 1 wherein:
   the first sensor is field of view sensor that produces the environment perception data from a predetermined field of view within an environment; and
   the second sensor is a steerable verifying sensor that produces the environment perception data from points within the environment according to a steerable sensing direction.

3. The apparatus of claim 2 wherein each of the field of view sensor and the steerable verifying sensor is selected from the group consisting of RADAR, LiDAR and camera sensors.

4. The apparatus of claim 1 wherein:
   the first sensor is selected from the group consisting of LiDAR, RADAR camera, and generic sensors of a first type;
   the second is selected from the group consisting of LiDAR, RADAR, camera and generic sensors of a second type;
   wherein the generic sensor of the first type captures the environment perception data from a predefined field of view,
   wherein the generic sensor of the second type captures the environment perception data in a steerable direction; and
   wherein one of the first sensor and second sensors cues the other of said first and second sensor.

5. The apparatus of claim 1 further comprising:
   a vehicular guidance processor programmed to provide maneuver information for the vehicle based at least in part on the object tracking information from the perception processor.

6. The apparatus of claim 5 wherein the vehicular guidance processor is programmed to supply planned maneuver information to the perception processor and wherein the perception processor is further programmed to use the planned maneuver information in constructing the attention signal to focus perception on the region of interest bearing a relationship to the planned maneuver.

7. The apparatus of claim 5 wherein the vehicular guidance processor is programmed to supply the planned maneuver information to the perception processor and wherein the perception processor is further programmed to use the planned maneuver information in constructing the attention signal to suppress perception within at least one region bearing no relationship to the planned maneuver.

8. The apparatus of claim 1 wherein the perception processor is further programmed to cross-validate each of the first sensor and the second sensor against each other, and to supply the object tracking information if each of the first and second sensors detects the same object.

9. The apparatus of claim 1 wherein the first sensor is a camera and the second sensor is selected from the group consisting of RADAR and LiDAR sensors.

10. The apparatus of claim 1 wherein the attention signal is constructed using a bitmap data structure to represent a region of interest.

11. The apparatus of claim 1 wherein the attention signal is constructed using a bitmap data structure to convey information.

12. The apparatus of claim 1 wherein the first sensor is a camera that produces environment perception data organized as a grid of pixels and wherein the attention signal is constructed using a bitmap data structure that maps onto the grid of pixels to represent the region of interest.

13. The apparatus of claim 1 wherein the second sensor is a LiDAR that produces the environment perception data organized as a point cloud and wherein the attention signal is constructed using a bitmap data structure that maps onto a point cloud grouping to represent the region of interest.

14. The apparatus of claim 1 wherein the first sensor is a camera employing a sensor with individually addressable pixels and wherein the attention signal is constructed using a data structure that maps onto a collection of individually addressable pixels to represent the region of interest.

15. The apparatus of claim 1 wherein the second sensor is a LiDAR employing a steerable laser beam and wherein the attention signal supplies the LiDAR with laser steering direction information.

16. The apparatus of claim 1 further comprising:
a vehicular guidance, navigation and control processor programmed:
(a) to provide maneuver information for the vehicle based at least in part on the object tracking information from the perception processor;
(b) to use the planned maneuver in constructing the attention signal according to one of: (i) focusing perception on a region of interest bearing a relationship to the planned maneuver; and (ii) suppressing perception within a region bearing no relationship to the planned maneuver.

17. A method for tracking objects in vehicular applications, comprising:
obtaining environment perception data from a vehicle mounted perception sensor having a first sensor employing a first sensing modality and a second sensor employing a second sensing modality different from the first sensing modality;
using a processor to perform object recognition upon the environment perception data to identify at least one object in association with a computed confidence score;
using the processor to assess a relationship of the confidence score to a predetermined threshold and based on the assessed relationship, the processor directing attention of one of the first and second sensors to a region of interest determined by the other of the first and second sensors, thereby priming the one of the first and second sensors to capture enhanced information about the object;
using the processor to mediate the object tracking using the enhanced information.

18. The method of claim 17 further comprising obtaining vehicle maneuver information and using the processor to mediate how directing attention of one of the first and second sensors to a region of interest is performed according to one of the following:
(i) focusing perception on at least one region of interest bearing a relationship to the planned maneuver; and
(ii) suppressing perception within at least one region bearing no relationship to the planned maneuver.

19. The method of claim 17 further comprising:
using the processor to direct attention of the camera to a region of interest by generating a bitmap data structure to represent the region of interest that maps onto a collection of individual pixels within the camera.

20. The method of claim 17 further comprising:
the processor using the environment perception data to construct a feature map comprising an image-based feature map constructed using camera data and a range feature map constructed using LiDAR data, where the camera data and LiDAR data are spatially calibrated.

* * * * *